US012586015B2

(12) United States Patent
Mehrnezhad et al.

(10) Patent No.: US 12,586,015 B2
(45) Date of Patent: Mar. 24, 2026

(54) RESOURCE-RELATED FORECASTING USING MACHINE LEARNING TECHNIQUES

(71) Applicant: Dell Products L.P., Round Rock, TX (US)

(72) Inventors: Ali Mehrnezhad, Liberty Hill, TX (US); Siamak Saliminejad, Austin, TX (US); Prateek Srivastava, Cedar Park, TX (US); Saurabh Guleria, Round Rock, TX (US); Akshit Sharma, Austin, TX (US); Akhil Koppera, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 175 days.

(21) Appl. No.: 18/196,543

(22) Filed: May 12, 2023

(65) Prior Publication Data

US 2024/0378520 A1    Nov. 14, 2024

(51) Int. Cl.
*G06Q 10/0631* (2023.01)

(52) U.S. Cl.
CPC . *G06Q 10/06313* (2013.01); *G06Q 10/06315* (2013.01)

(58) Field of Classification Search
None
See application file for complete search history.

(56) References Cited

U.S. PATENT DOCUMENTS

| | | | |
|---|---|---|---|
| 7,197,474 B1 * | 3/2007 | Kitts | G06Q 30/02 |
| | | | 705/7.31 |
| 7,743,001 B1 * | 6/2010 | Vermeulen | G06Q 30/02 |
| | | | 705/400 |
| 8,762,227 B1 * | 6/2014 | Fox | G06Q 30/0255 |
| | | | 705/26.7 |
| 9,105,145 B2 | 8/2015 | Brown et al. | |

(Continued)

FOREIGN PATENT DOCUMENTS

| | | | |
|---|---|---|---|
| EP | 4318316 A1 * | 2/2024 | G06N 3/0464 |
| JP | 2012174108 A | 9/2012 | |

OTHER PUBLICATIONS

Tosi, Stefania, Sara Casolari, and Michele Colajanni. "Detecting correlation between server resources for system management." Journal of Computer and System Sciences 80.4 (2014): 821-836. (Year: 2014).*

*Primary Examiner* — Brian M Epstein
*Assistant Examiner* — Derick J Holzmacher
(74) *Attorney, Agent, or Firm* — Ryan, Mason & Lewis, LLP

(57) ABSTRACT

Methods, apparatus, and processor-readable storage media for resource-related forecasting using machine learning techniques are provided herein. An example computer-implemented method includes obtaining multiple items of data related to one or more resources associated with an enterprise; correlating at least a portion of the multiple items of data with at least one target variable using one or more correlation techniques; generating one or more forecasts pertaining to the at least one target variable and at least a (Continued)

500 ⟋ OBTAIN MULTIPLE ITEMS OF DATA RELATED TO ONE OR MORE RESOURCES ASSOCIATED WITH AN ENTERPRISE

502 ⟋ CORRELATE AT LEAST A PORTION OF THE MULTIPLE ITEMS OF DATA WITH AT LEAST ONE TARGET VARIABLE USING ONE OR MORE CORRELATION TECHNIQUES

504 ⟋ GENERATE ONE OR MORE FORECASTS PERTAINING TO THE AT LEAST ONE TARGET VARIABLE AND AT LEAST A PORTION OF THE ONE OR MORE RESOURCES BY PROCESSING AT LEAST A PORTION OF THE CORRELATED DATA USING ONE OR MORE MACHINE LEARNING TECHNIQUES

506 ⟋ PERFORM ONE OR MORE AUTOMATED ACTIONS BASED AT LEAST IN PART ON THE ONE OR MORE FORECASTS portion of the one or more resources by processing at least a portion of the correlated data using one or more machine learning techniques; and performing one or more automated actions based at least in part on the one or more forecasts.

20 Claims, 7 Drawing Sheets

(56) References Cited

U.S. PATENT DOCUMENTS

| | | | | |
|---|---|---|---|---|
| 9,495,234 | B1 * | 11/2016 | Hamman | H04L 43/20 |
| 10,410,155 | B2 * | 9/2019 | Das | G06Q 10/06315 |
| 10,706,191 | B2 * | 7/2020 | Sun | H04N 21/25 |
| 11,520,667 | B1 * | 12/2022 | Savir | G06Q 10/0631 |
| 2008/0221954 | A1 * | 9/2008 | Reisz | G06Q 30/0202 |
| | | | | 705/7.14 |
| 2012/0246718 | A1 * | 9/2012 | Spears | G06Q 30/0202 |
| | | | | 726/21 |
| 2016/0239776 | A1 * | 8/2016 | Feng | G06Q 30/0201 |
| 2016/0239855 | A1 * | 8/2016 | Feng | G06Q 30/0202 |
| 2016/0260052 | A1 * | 9/2016 | Ray | G06Q 10/087 |
| 2016/0260109 | A1 * | 9/2016 | Feng | G06Q 30/0202 |
| 2016/0260110 | A1 * | 9/2016 | Ray | G06Q 10/06315 |
| 2016/0260111 | A1 * | 9/2016 | Ray | G06F 18/23 |
| 2016/0328724 | A1 * | 11/2016 | Ray | G06Q 10/087 |
| 2017/0053336 | A1 * | 2/2017 | Barbour | G06F 16/9535 |
| 2017/0053344 | A1 | 2/2017 | Yaplee et al. | |
| 2017/0060638 | A1 * | 3/2017 | Goyal | G06Q 10/0631 |
| 2017/0061452 | A1 * | 3/2017 | Mukherjee | G06Q 10/087 |
| 2017/0213227 | A1 * | 7/2017 | Johnson | G06Q 30/0202 |
| 2018/0137445 | A1 * | 5/2018 | Tijerina | G06Q 10/06313 |
| 2019/0065638 | A1 * | 2/2019 | Sun | H04L 65/10 |
| 2020/0074323 | A1 * | 3/2020 | Martin | G06F 17/142 |
| 2020/0090093 | A1 * | 3/2020 | Bianchi | G01W 1/10 |
| 2021/0166251 | A1 * | 6/2021 | Mehmanpazir | G06N 3/0464 |
| 2021/0272121 | A1 * | 9/2021 | Harris | G06F 21/6245 |
| 2021/0357402 | A1 * | 11/2021 | Cheng | G06F 16/2477 |
| 2021/0357835 | A1 * | 11/2021 | Modi | G06F 40/194 |
| 2022/0207506 | A1 * | 6/2022 | Daruna | G06Q 20/407 |
| 2022/0269835 | A1 * | 8/2022 | Yang | G06N 7/01 |
| 2022/0318711 | A1 * | 10/2022 | Recasens | G06Q 10/06315 |
| 2023/0004991 | A1 * | 1/2023 | Herman-Saffar | G06F 18/214 |
| 2023/0096633 | A1 * | 3/2023 | Thayaparan | G06N 20/20 |
| | | | | 705/348 |
| 2023/0177535 | A1 * | 6/2023 | Passalis | G06Q 30/0201 |
| | | | | 705/7.31 |
| 2023/0289721 | A1 * | 9/2023 | Ouellet | G06Q 30/0202 |
| 2023/0298055 | A1 * | 9/2023 | Woytarowicz | G06Q 30/0204 |
| | | | | 705/7.31 |
| 2023/0298058 | A1 * | 9/2023 | Woytarowicz | G06Q 30/0205 |
| | | | | 705/7.34 |
| 2023/0351211 | A1 * | 11/2023 | Nath | G06Q 30/01 |
| 2024/0028935 | A1 * | 1/2024 | Dorle | G06N 20/00 |
| 2024/0037419 | A1 * | 2/2024 | Mukhopadhyay | G06N 5/022 |
| 2024/0095093 | A1 * | 3/2024 | Chen | G06N 20/00 |
| 2024/0144090 | A1 * | 5/2024 | Chen | G06N 20/00 |

* cited by examiner

300

| DATA =                | FISCAL_QUARTER | YEARLY_DIFF_DTV_RECENT_QUAT | YEARLY_DIFF_GT_RECENT_QUAT |
|-----------------------|----------------|-----------------------------|-----------------------------|
| 26                    | 2021-Q3        | 1444232.0                   | -53.0                       |

LABEL = ['0']

PROB OF 0 = [0.65109651]

PROB OF 1 = [0.34890349]

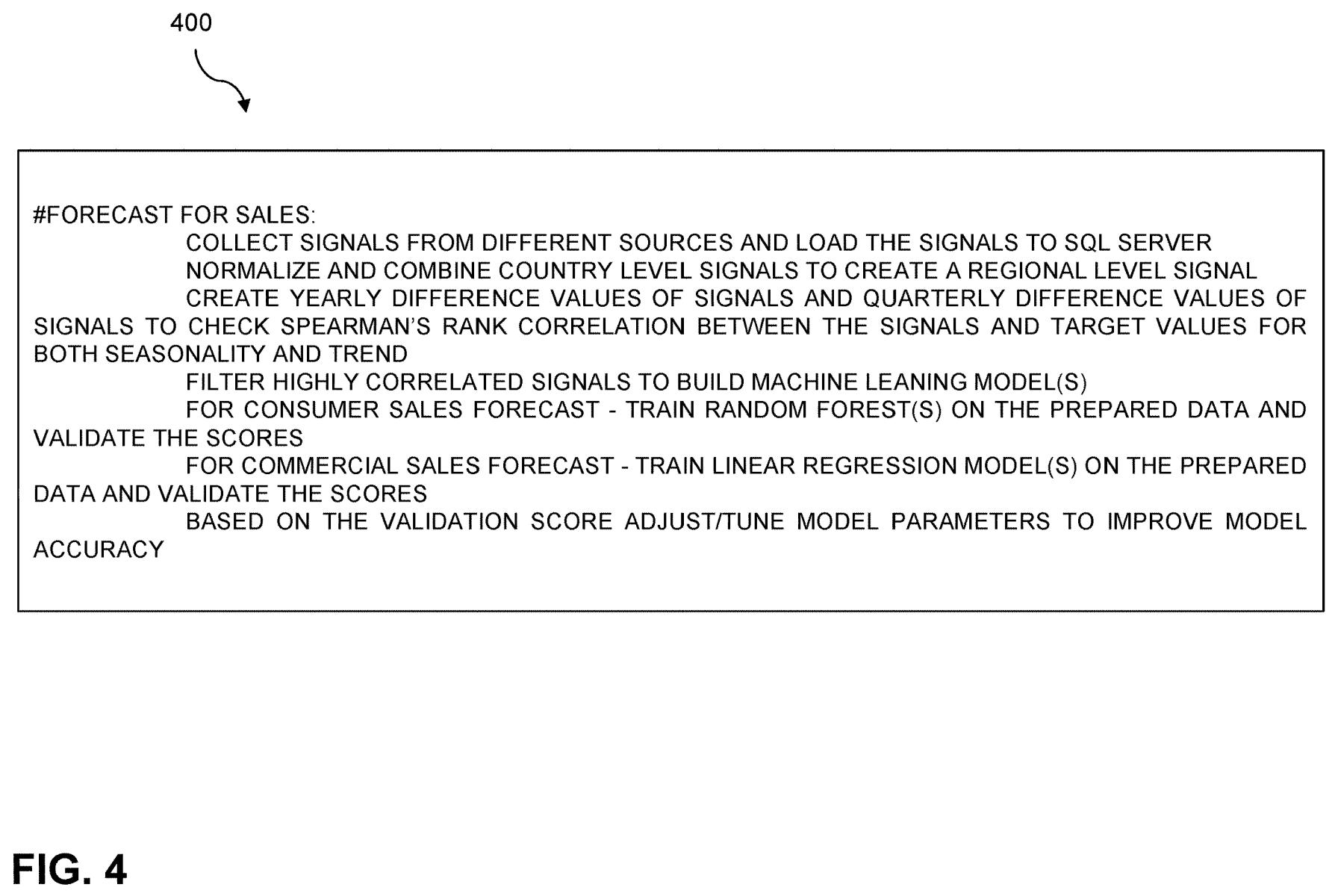

FORECAST FOR SALES:
    COLLECT SIGNALS FROM DIFFERENT SOURCES AND LOAD THE SIGNALS TO SQL SERVER
    NORMALIZE AND COMBINE COUNTRY LEVEL SIGNALS TO CREATE A REGIONAL LEVEL SIGNAL
    CREATE YEARLY DIFFERENCE VALUES OF SIGNALS AND QUARTERLY DIFFERENCE VALUES OF
SIGNALS TO CHECK SPEARMAN'S RANK CORRELATION BETWEEN THE SIGNALS AND TARGET VALUES FOR
BOTH SEASONALITY AND TREND
        FILTER HIGHLY CORRELATED SIGNALS TO BUILD MACHINE LEANING MODEL(S)
        FOR CONSUMER SALES FORECAST - TRAIN RANDOM FOREST(S) ON THE PREPARED DATA AND
VALIDATE THE SCORES
        FOR COMMERCIAL SALES FORECAST - TRAIN LINEAR REGRESSION MODEL(S) ON THE PREPARED
DATA AND VALIDATE THE SCORES
        BASED ON THE VALIDATION SCORE ADJUST/TUNE MODEL PARAMETERS TO IMPROVE MODEL
ACCURACY

FIG. 4

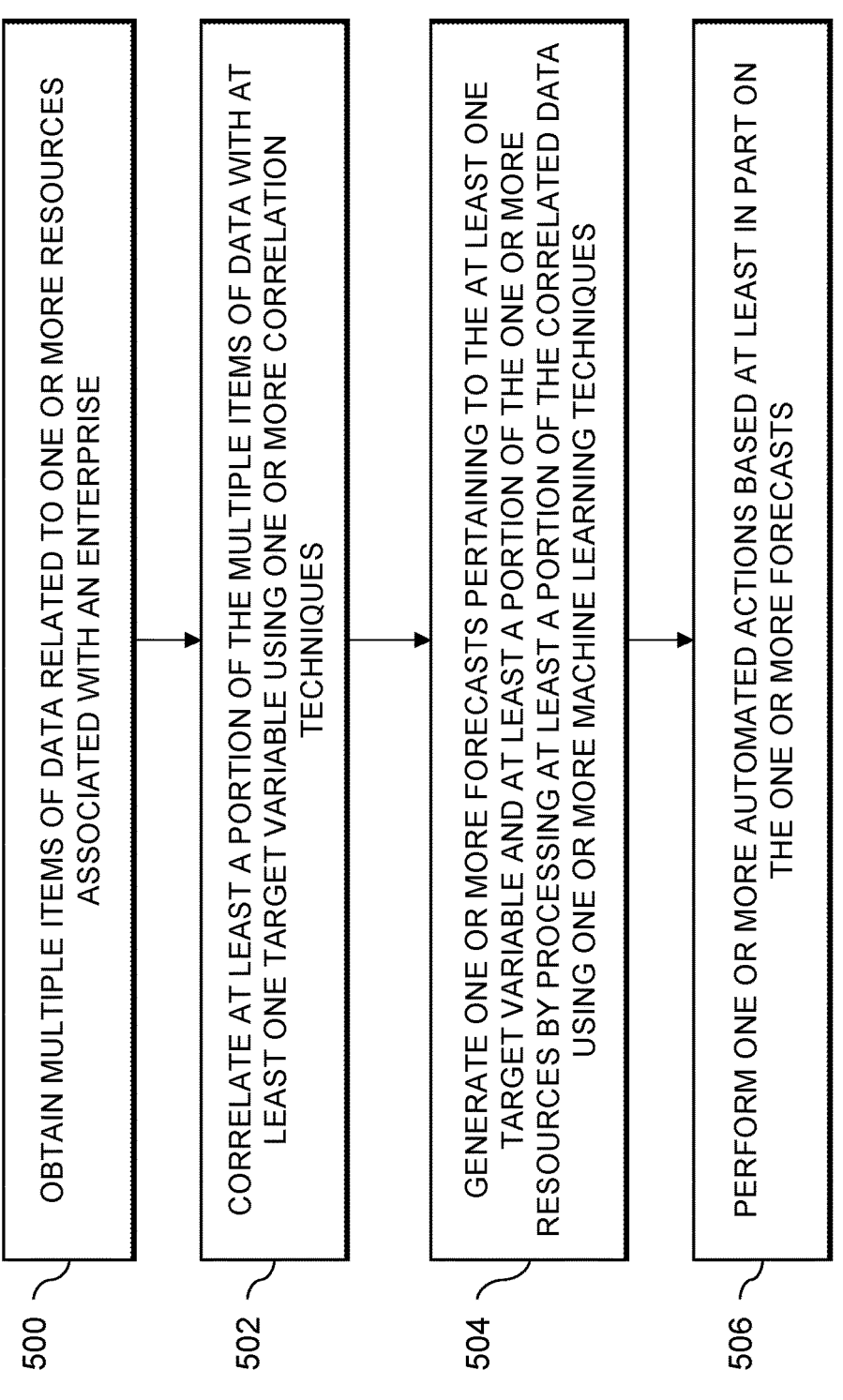

500 — OBTAIN MULTIPLE ITEMS OF DATA RELATED TO ONE OR MORE RESOURCES ASSOCIATED WITH AN ENTERPRISE

502 — CORRELATE AT LEAST A PORTION OF THE MULTIPLE ITEMS OF DATA WITH AT LEAST ONE TARGET VARIABLE USING ONE OR MORE CORRELATION TECHNIQUES

504 — GENERATE ONE OR MORE FORECASTS PERTAINING TO THE AT LEAST ONE TARGET VARIABLE AND AT LEAST A PORTION OF THE ONE OR MORE RESOURCES BY PROCESSING AT LEAST A PORTION OF THE CORRELATED DATA USING ONE OR MORE MACHINE LEARNING TECHNIQUES

506 — PERFORM ONE OR MORE AUTOMATED ACTIONS BASED AT LEAST IN PART ON THE ONE OR MORE FORECASTS

FIG. 5

RESOURCE-RELATED FORECASTING USING MACHINE LEARNING TECHNIQUES

COPYRIGHT NOTICE

FIELD

The field relates generally to information processing systems, and more particularly to resource management in such systems.

BACKGROUND

Usage and demand for various resources, such as hardware devices, have occasionally shifted significantly and unexpectedly due to sudden changes to circumstances and/or externalities. However, conventional resource forecasting techniques commonly rely on individual signals and static rules to predict future resource-related parameters, irrespective of the influence of such individual signals on the target signal(s). Accordingly, such conventional techniques can often produce inaccurate and/or erroneous results.

SUMMARY

Illustrative embodiments of the disclosure provide techniques for resource-related forecasting using machine learning techniques.

An exemplary computer-implemented method includes obtaining multiple items of data related to one or more resources associated with an enterprise, and correlating at least a portion of the multiple items of data with at least one target variable using one or more correlation techniques. Also, the method includes generating one or more forecasts pertaining to the at least one target variable and at least a portion of the one or more resources by processing at least a portion of the correlated data using one or more machine learning techniques. Further, the method additionally includes performing one or more automated actions based at least in part on the one or more forecasts.

Illustrative embodiments can provide significant advantages relative to conventional resource forecasting techniques. For example, problems associated with inaccurate and/or erroneous results are overcome in one or more embodiments through automatically correlating resource-related data and generating one or more resource-related forecasts based at least in part thereon using one or more machine learning techniques.

These and other illustrative embodiments described herein include, without limitation, methods, apparatus, systems, and computer program products comprising processor-readable storage media.

BRIEF DESCRIPTION OF THE DRAWINGS

FIG. 3 shows an example output from a given machine learning model in an illustrative embodiment.

FIG. 4 shows example pseudocode for generating a forecast using a random forest model and/or a linear regression model in an illustrative embodiment.

FIG. 5 is a flow diagram of a process for resource-related forecasting using machine learning techniques in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
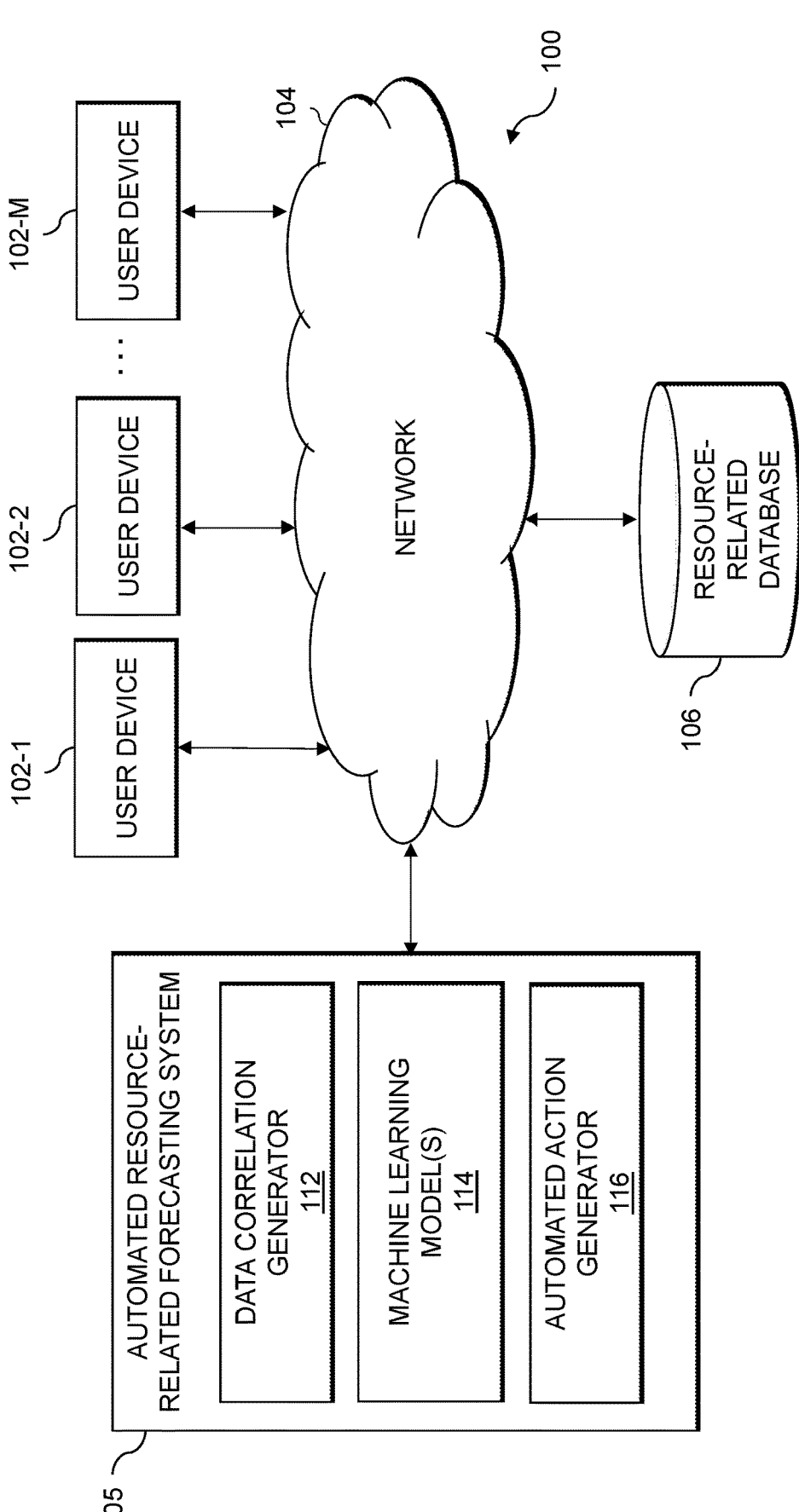
FIG. 1 shows an information processing system configured for resource-related forecasting using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated resource-related forecasting system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated resource-related forecasting system 105 can have an associated resource-related database 106 configured to store data pertaining to resource-related information associated with one or more temporal periods, one or more geographic regions, etc., which comprise, for example, trend data, seasonality data, inventory data, sales data, etc.

The resource-related database 106 in the present embodiment is implemented using one or more storage systems associated with automated resource-related forecasting system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated resource-related forecasting system 105 are one or more input-output devices, which illustratively comprise keyboards, displays or other types of input-output devices in any combination. Such input-output devices can be used, for example, to support one or more user interfaces to automated resource-related forecasting system 105, as well as to support communication between automated resource-related forecasting system 105 and other related systems and devices not explicitly shown.

Additionally, automated resource-related forecasting system 105 in the FIG. 1 embodiment is assumed to be implemented using at least one processing device. Each such processing device generally comprises at least one processor and an associated memory, and implements one or more functional modules for controlling certain features of automated resource-related forecasting system 105.

More particularly, automated resource-related forecasting system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated resource-related forecasting system 105 to communicate over the network 104 with the user devices 102, and illustratively comprises one or more conventional transceivers.

The automated resource-related forecasting system 105 further comprises data correlation generator 112, machine learning model(s) 114, and automated action generator 116.

It is to be appreciated that this particular arrangement of elements 112, 114 and 116 illustrated in the automated resource-related forecasting system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automated resource-related forecasting involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated resource-related forecasting system 105 and resource-related database 106 can be on and/or part of the same processing platform.

An exemplary process utilizing elements 112, 114 and 116 of an example automated resource-related forecasting system 105 in computer network 100 will be described in more detail with reference to the flow diagram of FIG. 5.

Accordingly, at least one embodiment includes identifying signals to provide leading indication of resource trends. As further detailed herein, such an embodiment includes implementing a dynamic approach that analyzes data that are important and/or influential for a particular temporal duration (e.g., a quarter) rather than rely predominantly on averaged out data.

One or more embodiments include training and implementing machine learning techniques including, for example, random forests and/or one or more linear regression models for processing time series data. In such an embodiment, an automated pipeline is developed and/or implemented to collect data for multiple signals. Using at least a portion of the above-noted machine learning techniques, such an embodiment includes determining and/or identifying at least one correlation between at least a portion of the data for the multiple signals (e.g., information pertaining to the one or more target signals) and one or more target signals for a given resource-specific use case. Based at least in part on the at least one identified correlation, such an embodiment can further include marking the corresponding signal(s) to be used as one or more predictors of the one or more target signals for a given resource-specific use case.

In one or more embodiments, data associated with multiple signals can be collected at one or more temporal frequencies (e.g., monthly, weekly, etc.) and/or in connection with one or more geographic regions (e.g., at a country level, at a state level, etc.). Such geographically based data collection can include using local language keywords for the resource(s) in question (e.g., hardware devices such as laptops, desktops, etc.). As a part of implementation of an automated pipeline, at least one embodiment includes separately processing data associated with multiple signals in accordance with the same respective temporal frequencies and/or geographic regions (e.g., to capture seasonality information, one or more trend and/or cyclic fluctuations, etc.).

At least one embodiment can include generating one or more composite signals based at least in part on data from multiple signals, wherein such composite signals are generated using geographically-based data of portions of the signal data relative to other portions of the signal data (e.g., regional share percentage of sales of a given type of hardware device), and calculating one or more correlation measures (e.g., Spearman's rank correlation, Pearson correlation, Kendall rank correlation, and/or Point-Biserial correlation) between variables. In at least one example embodiment, the Spearman's rank correlation (also referred to herein simply as Spearman's correlation) can be calculated between temporally based differenced values (e.g., quarterly differenced values) of data from the multiple signals and at least one particular target signal. Calculating the Spearman's rank correlation can facilitate determination of one or more commonalities and/or similarities in parameters such as, for example, in seasonality, one or more trends, etc., which can be leveraged to determine an overall similarity between at least a portion of the multiple signals and the at least one target signal. By way merely of example, a composite signal might include net traffic data (e.g., the number of visits to a given website, the number of people searching for a given technological item and/or product, etc.) collected using local language keywords.

For instance, consider an example use case involving a forecast for consumer sales of one or more items of information technology hardware. In such a use case, one or more embodiments can include collecting signal data from different sources and loading at least a portion of such signal data to a structured query language (SQL) server. Further, country level signals can be normalized and combined to create a regional level signal based on the percentage of sales in the region for a given country multiplied by the normalized value of the associated country level signal. Additionally, such an example embodiment can include creating yearly difference values of signals and/or quarterly difference values of signals (n, representing the number of observations for the yearly and/or quarterly signals) to measure and/or determine the Spearman's rank correlation ($\rho$) between the signals and target values for seasonality and trend ($d_i$, the difference between the seasonality and trend ranks at each yearly or quarterly observation), wherein such a Spearman's rank correlation calculation can be carried out using the following equation:

$$\rho = 1 - \frac{6\Sigma d_i^2}{n(n^2 - 1)}$$

Additionally, as further detailed herein, one or more highly correlated signals can be filtered out of the results and used in part to build and/or train one or more machine leaning models.

By way of illustration and example, consider a use case involving a target signal related to sales of a given resource such as a laptop (or other similar hardware device). Based at least in part on one or more enterprise requirements and data availability, various scenarios can be defined for both the consumer market and the commercial market, and corresponding machine learning models can be trained and/or implemented. For example, at least one random forest can be trained and/or implemented in connection with at least classification problem associated with consumer market data, and one or more linear regression models can be trained and/or implemented in connection with commercial market data, wherein both types of machine learning models can be used to predict temporally-based market fluctuations (e.g., quarterly market fluctuations) upon obtaining and/or processing an additional data point associated with at least one signal (e.g., when such a data point is made available in the corresponding quarter, the previous quarter, etc.). In such an example use case, one or more consumer market data-based models can be trained and/or implemented to identify market trend movement (e.g., a downturn in the market) based at least in part on processed signal values (e.g., the increase or decrease of laptop shipments with respect to the previous year's corresponding quarter). Similarly, in such an example use case, one or more commercial market data-based models can be trained and/or implemented to predict future laptop shipment values based at least in part on processed signal values. Additionally, in at least one embodiment, one or more parameters (e.g., the minimum number of samples in a node of each decision tree, the depth of a decision tree, optimizing loss entropy, the number of random features to include at each node, the number of trees to be built in random forests, etc.) of such machine learning models can be fine-tuned based at least in part on performance factor F-score(s) (for classification models) and R2 value(s) (for regression models) determined in connection with historical data.

Accordingly, one or more embodiments include selecting one or more data sources to represent a given target resource-related signal (e.g., at least a portion of an enterprise laptop market), implementing a framework which includes enriching at least a portion of such data with one or more correlations, and using one or more machine learning models to generate one or more determinations and/or predictions related to the given target resource-related signal (e.g., predicting the probability of downward and/or upward movements in laptop sales with respect to at least one given temporal parameter).

By way of further illustration, consider an example embodiment, which includes collecting monthly data for signals based on keywords such as laptop and desktop. Such an example embodiment can also include creating at least one regional level signal by determining a weighted sum of country-level signals with respect to laptop and/or desktop sales, and performing one or more Spearman's ranks correlation calculations between quarterly sales and monthly data associated the at least one regional level signal to determine one or more predictive and/or vital signals (i.e., one or more signals to be used in predicting at least one target signal of interest).

As noted above, one or more embodiments can include performing one or more Spearman's ranks correlation calculations. By way merely of example, such an embodiment can include determining one or more seasonality similarities by performing at least one Spearman's ranks correlation calculation between quarterly differenced values of signals (e.g., the number of visits to a given website, the number of people searching for a given technological item and/or product, etc.) and laptop shipments. Further, such an example embodiment can include (as detailed, e.g., in connection with FIG. 3) determining trend similarity and overall similarity between such signals and laptop shipment data by using yearly difference values and quarterly actual values, respectively.

Based at least in part on such collected data enriched with one or more correlations, at least one embodiment can include implementing one or more machine learning models to generate one or more related forecasts and/or predictions. For example, and as noted here, implementing one or more machine learning models can include implementing one or more random forest classification models for predicting, e.g., at least one downturn and/or at least one upturn in consumer laptop sales, and implementing one or more linear regression models for forecasting future commercial laptop sales. In one or more example embodiments, random forests are implemented for consumer data as the signal data available is not linearly related to the target and can be of poor quality in comparison to the signals available for commercial data. Also, in such example embodiments, one or more linear regression models are implemented for commercial data because the signal data available for commercial contexts have sufficient correlation values.

In such an example embodiment, collected data can include, for instance, monthly data for signals such as search engine trend data based on relevant keywords (e.g., "laptop," "desktop." etc.). Such search engine trend data can be processed, for example, with respect to one or more geographic regions using one or more local language keywords corresponding to target keywords (e.g., "laptop," "desktop," "), and creating a regional level search engine trend signal by taking a weighted sum of region-level search engine trend values.

By way of example, consider a use case wherein the number of search engine searches for laptops can be extracted using keywords such as, e.g., "portable," "computer," etc. Country level signals can then be normalized and combined to create a regional level signal. For example, the regional signal can be based at least in part on the percentage of laptop sales in the region for a given country multiplied by the normalized value of the country level signal. Additionally, one or more trend signals can be created in order to identify, for example, a decrease in laptop sales, and such trend signals can help one or more machine learning models to foresee the sales future and observe correlation(s) to one or more target trends.

Such an example embodiment can also include performing one or more Spearman's ranks correlation calculations to determine and/or identify one or more important and/or influential signals by, e.g., adding up the monthly data of the above-noted signals. By way of example, Spearman's correlation calculations between quarterly differenced values of signals and laptop shipments can be used to determine one or more seasonality similarities (e.g., calculated across different quarters for the same geographic location). Similarly, yearly difference values can be used, for example, for determining one or more similarities in trend data, wherein actual quarterly values can be used to determine one or more overall similarities between the signals and laptop shipment data. By way merely of illustration, a signal having a Spearman's correlation value greater than 0.5 for seasonality, trend and overall similarity can be considered an important and/or influential signal for forecasting purposes.

Such ultimate forecasts can then be utilized to perform one or more automated actions such as, for example, allocating resources (e.g., via one or more warehouse management techniques and/or systems) in accordance with one or more resource-related trends for one or more upcoming temporal periods (e.g., one or more upcoming quarters), automatically training and/or tuning at least a portion of the associated machine learning models, etc.

Accordingly, and as detailed herein, one or more embodiments include determining and/or identifying one or more data signals that provide a leading indication for one or more resource-related trends. Such an embodiment includes training and/or implementing one or more machine learning models to predict data pertaining to at least a portion of the one or more resource-related trends, for example, in connection with one or more predetermined temporal parameters (e.g., whether the laptop market is going to have positive or negative year-over-year percentage value, along with the probability thereof). Such training and/or implementing of one or more machine learning models (e.g., random forest classification models, linear regression models, etc.) can include enriching and/or preprocessing data by determining one or more data correlations (e.g., via performing one or more Spearman's correlation calculations).

By way merely of example and/or illustration, one or more embodiments can include generating composite signals, to be processed by one or more machine learning models in connection with one or more resource-related forecasts, by adding the values of laptop sales and desktop sales for at least one given temporal period, multiplying the resulting sum by a value representing the proportion of laptop and desktop shipments associated with a given geographic region (e.g., country), and aggregating such data from different geographic regions. Such an example composite signal generation can be based at least in part on collected data which can include, e.g., enterprise traffic data (e.g., the number of visitors to an enterprise website over a given period of time), unique visitor data (e.g., the number of unique visitors to the enterprise website over the given period of time), virtual shopping cart visit data (e.g., the number of visits to virtual shopping carts within the enterprise website over the given period of time), search engine trend data (e.g., the number of searches using the keywords (in one or more languages) "laptop" and "desktop" on one or more search engines over the given period of time), channel inventory data (e.g., the amount of the given resource (e.g., the number of laptops and/or desktops) in stock with the enterprise over the given period of time), revenue data (e.g., the amount of revenue received in connection with the given resource over the given period of time), run rate revenue data (e.g., a value calculated by (revenue in a given period divided by the number of days in the given period)*365), etc. Example signal data such as noted above can be collected and/or extracted (from one or more data sources) separately for each of one or more geographic regions and associated with each of one or more resource-related keywords to facilitate processing in comparable scales.

By way of further illustration, such an example embodiment can include training and/or implementing one or more machine learning models. For instance, with respect to a consumer segment, such an example embodiment includes training and/or implementing one or more ensemble classification models (e.g., one or more random forest classification models) to predict labels of 0 or 1, as well as the corresponding probability of occurrence, wherein 0 indicates a reduction in consumer sales for the forecasted temporal period and 1 indicates an increase in consumer sales for the forecasted temporal period. Also, in such an example embodiment, one or more parameters of the one or more ensemble classification models can be fine-tuned based at least in part on one or more performance metrics (e.g., the F-score) using historical data (e.g., training data and testing data)

Figure 2:
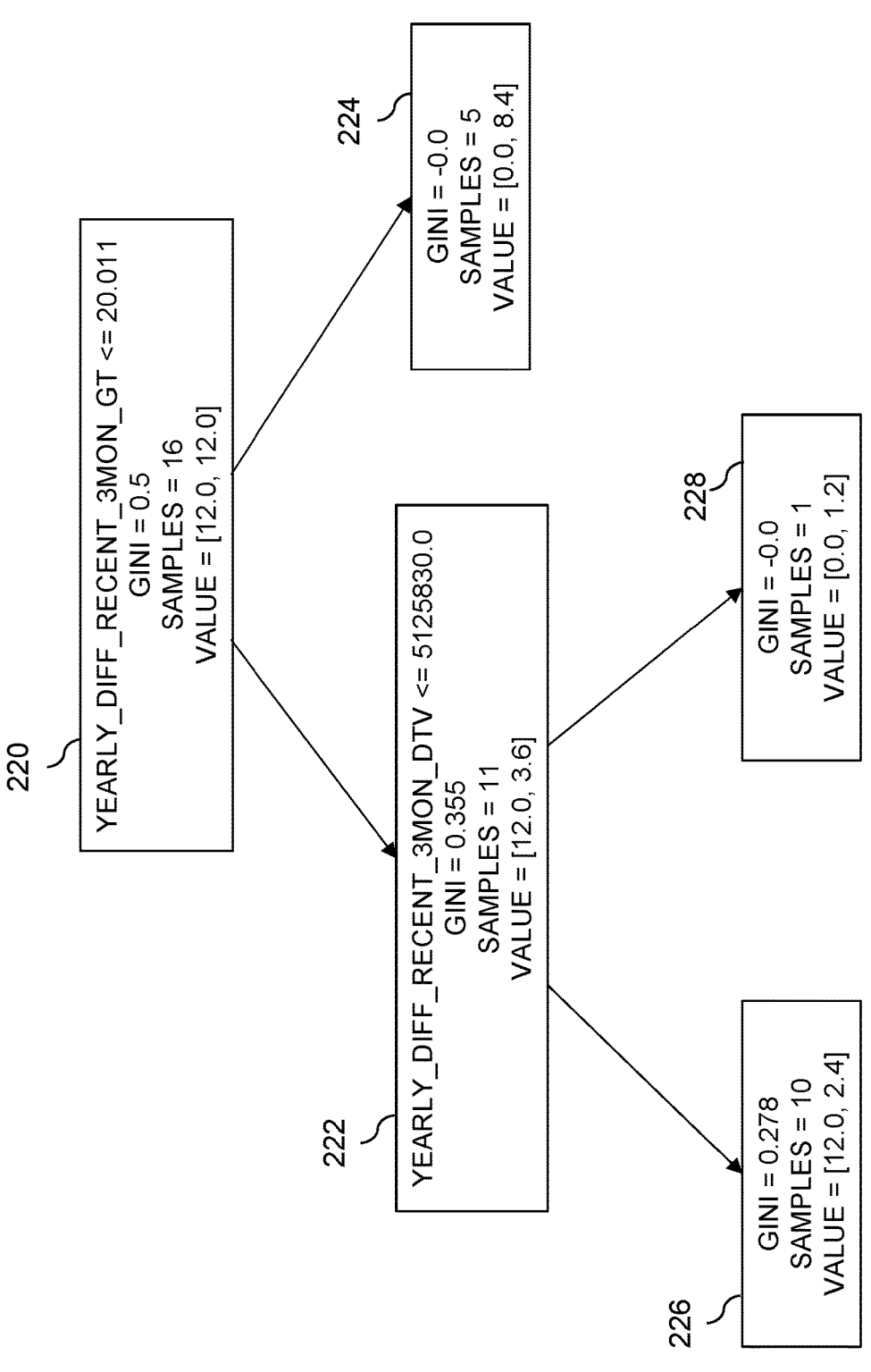
FIG. 2 shows an example decision tree associated with at least one random forest classification model in an illustrative embodiment.

FIG. 2 shows an example decision tree associated with at least one random forest classification model in an illustrative embodiment. By way of illustration, FIG. 2 depicts an example architecture of a decision tree, with cells 220, 222, 224, 226 and 228, in connection with a given random forest classification model, along with values associated with one or more performance metrics used (e.g., feature importance). More specifically, cell 220 checks for the yearly difference value of a search engine trend, and all of the data points having a yearly difference value of the search engine trend greater than 20.011 are sent to cell 222 for further analysis. If the yearly difference value is less than 20.011, then such data are sent to cell 224 and classified as class '1.' Also, cell 222 for an enterprise trend value being less than 512583.0, and sends any such related data to cell 226. If any such data fails the condition, that data can be labelled as class '0' and if any such data passes the condition, such data is sent to cell 228 and classified as class '0.' In one or more example embodiments, class '0' represents lower sales in comparison to the previous year's corresponding sales, and class '1' corresponds to an increase in sales.

FIG. 3 shows an example output 300 from a given machine learning model in an illustrative embodiment. By way of illustration, FIG. 3 depicts a yearly difference value of 1444232.0 associated with a first trend, is the yearly difference of −53.0 associated with a second trend, and a label of '0' generated by the given machine learning model (along with the probability of that label determination).

FIG. 4 shows example pseudocode for generating a forecast using a random forest model and/or a linear regression model in an illustrative embodiment. In this embodiment, example pseudocode 400 is executed by or under the control of at least one processing system and/or device. For example, the example pseudocode 400 may be viewed as comprising a portion of a software implementation of at least part of automated resource-related forecasting system 105 of the FIG. 1 embodiment.

The example pseudocode 400 illustrates collecting signal data from different sources and loading at least a portion of such data to at least one SQL server. For such loaded data, country level signals are normalized and combined to create a regional level signal. By way of example, a regional signal can be based at least in part on the percentage of sales in the region for a given country multiplied by the normalized value of the country level signal. Referring again to FIG. 4, example pseudocode 400 also illustrates creating yearly difference values of signals and quarterly difference values of signals to check at least one Spearman's rank correlation between the signals and one or more target values for both seasonality and trend. Example pseudocode 400 additionally depicts filtering highly correlated signals (e.g., signals having correlation values above a predetermined threshold) to build and/or train one or more machine leaning models.

For a consumer sales forecast, example pseudocode 400 includes training one or more random forests on the prepared data and validating the resulting scores. For a commercial sales forecast, example pseudocode 400 includes training one or more linear regression models on the prepared data and validating the resulting scores. Further, based at least in part on the validation scores, example pseudocode 400 includes adjusting and/or tuning one or more machine learning model parameters to improve model accuracy.

It is to be appreciated that this particular example pseudocode shows just one example implementation of generating a forecast using a random forest model and/or a linear regression model, and alternative implementations can be used in other embodiments.

It is to be appreciated that some embodiments described herein utilize one or more machine learning models. It is to be appreciated that the term "model," as used herein, is intended to be broadly construed and may comprise, for example, a set of executable instructions for generating computer-implemented predictions. For example, one or more of the models described herein may be trained to generate predictions based at least in part on resource-related data and/or enterprise-related data associated with one or more temporal periods and/or one or more geographic regions, and such predictions can be used to initiate one or more automated actions (e.g., allocate resources, train and/or tune at least portions of the machine learning model(s), etc.).

FIG. 5 is a flow diagram of a process for resource-related forecasting using machine learning techniques in an illustrative embodiment. It is to be understood that this particular process is only an example, and additional or alternative processes can be carried out in other embodiments.

In this embodiment, the process includes steps 500 through 506. These steps are assumed to be performed by automated resource-related forecasting system 105 utilizing elements 112, 114 and 116.

Step 500 includes obtaining multiple items of data related to one or more resources associated with an enterprise. In at least one embodiment, obtaining multiple items of data related to one or more resources includes obtaining multiple items of time series data related to one or more categories of hardware devices.

Step 502 includes correlating at least a portion of the multiple items of data with at least one target variable using one or more correlation techniques. In one or more embodiments, correlating at least a portion of the multiple items of data with at least one target variable includes calculating at least one Spearman's rank correlation between the at least a portion of the multiple items of data and the at least one target variable. Additionally or alternatively, correlating at least a portion of the multiple items of data with at least one target variable can include calculating at least one Spearman's rank correlation between temporally based differenced values derived from the multiple items of data and the at least one target variable and/or calculating at least one Spearman's rank correlation between geographically based data derived from the multiple items of data and the at least one target variable.

Step 504 includes generating one or more forecasts pertaining to the at least one target variable and at least a portion of the one or more resources by processing at least a portion of the correlated data using one or more machine learning techniques. In at least one embodiment, generating one or more forecasts comprises processing at least a portion of the correlated data using at least one random forest classification model. Additionally or alternatively, generating one or more forecasts can include processing at least a portion of the correlated data using at least one linear regression model.

Step 506 includes performing one or more automated actions based at least in part on the one or more forecasts. In one or more embodiments, performing one or more automated actions comprises automatically allocating, in accordance with the one or more forecasts, at least a portion of the one or more (e.g., forecasted) resources in connection with one or more systems. Additionally or alternatively, performing one or more automated actions can include automatically allocating, in connection with one or more systems, at least one resource related to at least a portion of the one or more resources associated with the forecasting. Also, in at least one embodiment, performing one or more automated actions includes automatically training at least a portion of the one or more machine learning techniques using feedback related to at least a portion of the one or more forecasts.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically correlate resource-related data and generate one or more resource-related forecasts based at least in part thereon using one or more machine learning techniques. These and other embodiments can effectively overcome problems associated with inaccurate and/or erroneous results.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
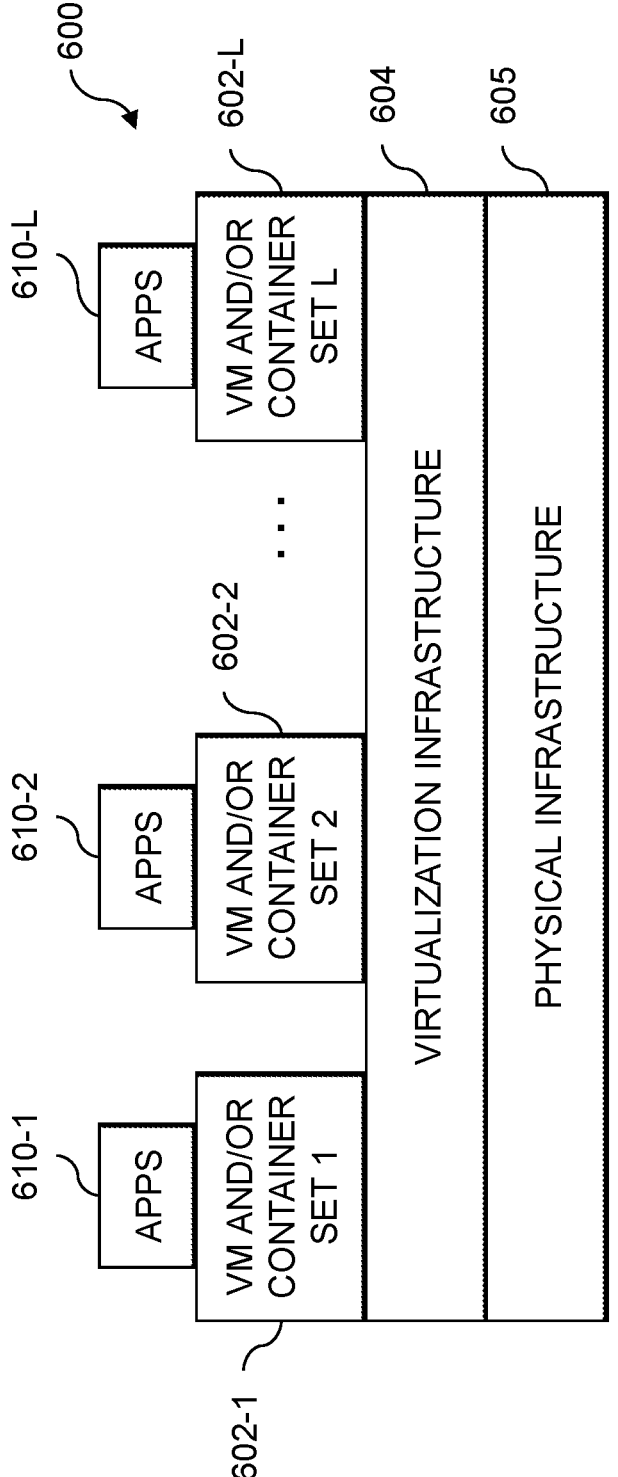
FIGS. 6 and 7 show examples of processing platforms that may be utilized to implement at least a portion of an information processing system in illustrative embodiments.
Figure 7:
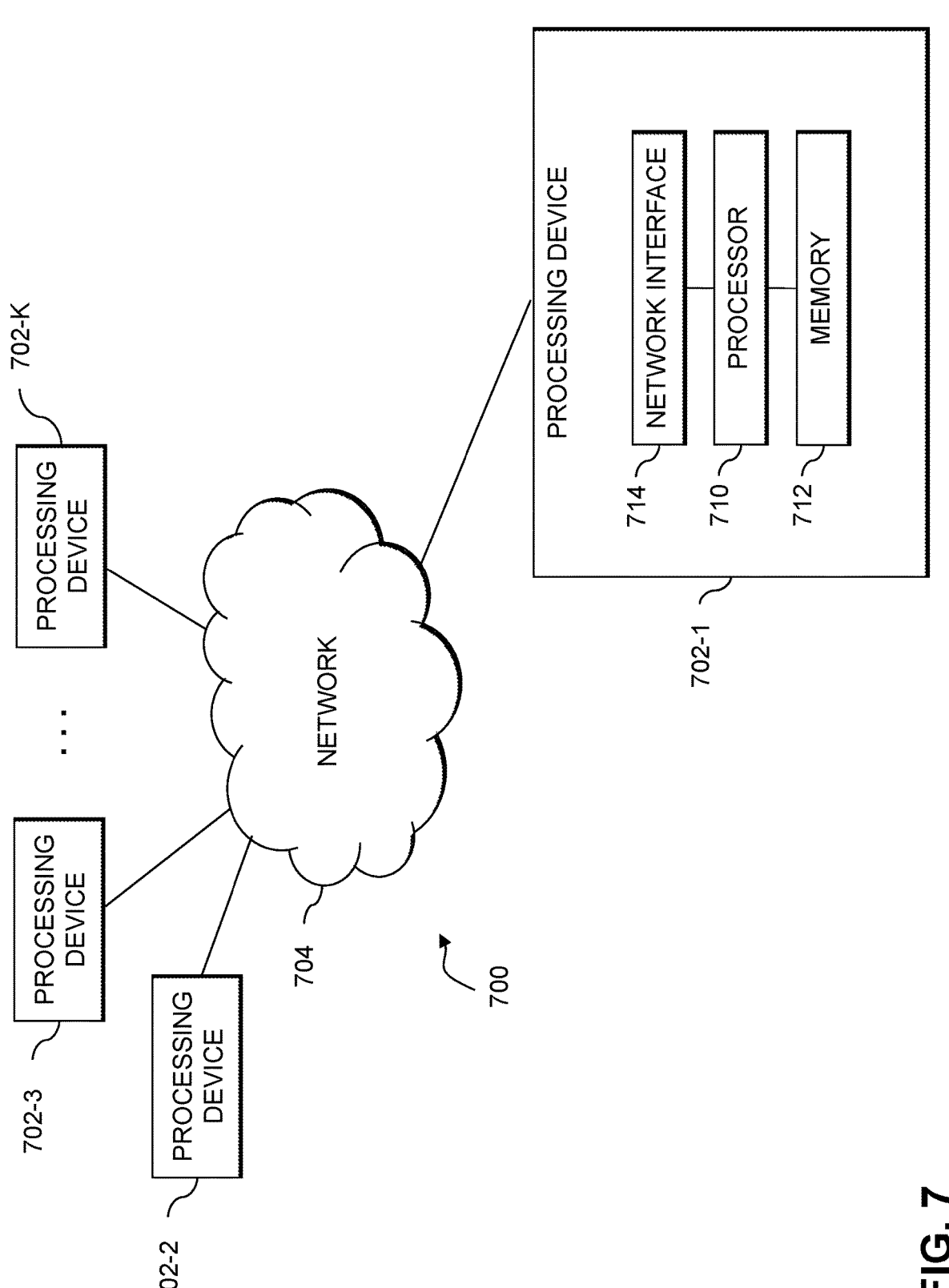

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more information processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a CPU, a GPU, a TPU, a microcontroller, an ASIC, a FPGA or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining multiple items of data related to one or more resources associated with an enterprise;

processing at least a plurality of the multiple items of data into at least one structured query language server;

correlating at least a portion of the multiple items of data within the at least one structured query language server with at least one target variable using one or more correlation techniques, wherein correlating the at least a portion of the multiple items of data with at least one target variable comprises calculating at least one rank correlation between temporally based differenced values derived from the multiple items of data and the at least one target variable;

automatically training at least one random forest model and at least one linear regression model based at least in part on the correlated portion of the multiple items of data associated with correlation values above at least one designated threshold, wherein automatically training the at least one random forest model comprises automatically learning model parameters comprising at least one number of samples in at least one node of at least one decision tree, depth of the at least one decision tree, at least one number of random features to associate with the at least one node, and at least one number of trees to be built in one or more random forests;

generating one or more forecasts pertaining to the at least one target variable and at least a portion of the one or more resources by processing input data related to the at least a portion of the one or more resources using the at least one trained random forest model and the at least one trained linear regression model; and performing one or more automated actions based at least in part on the one or more forecasts, wherein performing the one or more automated actions comprises automatically deploying, in accordance with the one or more forecasts, at least a portion of the one or more resources, wherein the at least a portion of the one or more resources comprises one or more hardware devices;

wherein the method is performed by at least one processing device comprising a processor coupled to a memory.

2. The computer-implemented method of claim 1, wherein performing the one or more automated actions comprises automatically allocating, in accordance with the one or more forecasts, at least a portion of the one or more resources in connection with one or more systems.

3. The computer-implemented method of claim 1, wherein correlating the at least a portion of the multiple items of data with at least one target variable comprises calculating at least one Spearman's rank correlation between the at least a portion of the multiple items of data and the at least one target variable.

4. The computer-implemented method of claim 1, wherein calculating at least one rank correlation between temporally based differenced values derived from the multiple items of data and the at least one target variable comprises calculating at least one Spearman's rank correlation between the temporally based differenced values derived from the multiple items of data and the at least one target variable.

5. The computer-implemented method of claim 1, wherein correlating the at least a portion of the multiple items of data with at least one target variable comprises calculating at least one Spearman's rank correlation between geographically based data derived from the multiple items of data and the at least one target variable.

6. The computer-implemented method of claim 1, wherein performing the one or more automated actions comprises automatically allocating, in connection with one or more systems, at least one resource related to at least a portion of the one or more resources associated with the one or more forecasts.

7. The computer-implemented method of claim 1, wherein performing the one or more automated actions comprises automatically training at least a portion of the at least one random forest model and the at least one linear regression model using feedback related to at least a portion of the one or more forecasts.

8. The computer-implemented method of claim 1, wherein obtaining the multiple items of data related to one or more resources comprises obtaining multiple items of time series data related to one or more categories of hardware devices.

9. A non-transitory processor-readable storage medium having stored therein program code of one or more software programs, wherein the program code when executed by at least one processing device causes the at least one processing device:

to obtain multiple items of data related to one or more resources associated with an enterprise;

to process at least a plurality of the multiple items of data into at least one structured query language server;

to correlate at least a portion of the multiple items of data within the at least one structured query language server with at least one target variable using one or more correlation techniques, wherein correlating the at least a portion of the multiple items of data with at least one target variable comprises calculating at least one rank correlation between temporally based differenced values derived from the multiple items of data and the at least one target variable;

to automatically train at least one random forest model and at least one linear regression model based at least in part on the correlated portion of the multiple items of data associated with correlation values above at least one designated threshold, wherein automatically training the at least one random forest model comprises automatically learning model parameters comprising at least one number of samples in at least one node of at least one decision tree, depth of the at least one decision tree, at least one number of random features to associate with the at least one node, and at least one number of trees to be built in one or more random forests;

to generate one or more forecasts pertaining to the at least one target variable and at least a portion of the one or more resources by processing input data related to the at least a portion of the one or more resources using the at least one trained random forest model and the at least one trained linear regression model; and to perform one or more automated actions based at least in part on the one or more forecasts, wherein performing the one or more automated actions comprises automatically deploying, in accordance with the one or more forecasts, at least a portion of the one or more resources, wherein the at least a portion of the one or more resources comprises one or more hardware devices.

10. The non-transitory processor-readable storage medium of claim 9, wherein performing the one or more automated actions comprises automatically allocating, in accordance with the one or more forecasts, at least a portion of the one or more resources in connection with one or more systems.

11. The non-transitory processor-readable storage medium of claim 9, wherein correlating the at least a portion of the multiple items of data with at least one target variable comprises calculating at least one Spearman's rank correlation between the at least a portion of the multiple items of data and the at least one target variable.

12. The non-transitory processor-readable storage medium of claim 9, wherein calculating at least one rank correlation between temporally based differenced values derived from the multiple items of data and the at least one target variable comprises calculating at least one Spearman's rank correlation between the temporally based differenced values derived from the multiple items of data and the at least one target variable.

13. The non-transitory processor-readable storage medium of claim 9, wherein correlating the at least a portion of the multiple items of data with at least one target variable comprises calculating at least one Spearman's rank correlation between geographically based data derived from the multiple items of data and the at least one target variable.

14. The non-transitory processor-readable storage medium of claim 9, wherein performing the one or more automated actions comprises automatically training at least a portion of the at least one random forest model and the at least one linear regression model using feedback related to at least a portion of the one or more forecasts.

15. An apparatus comprising:

at least one processing device comprising a processor coupled to a memory;

the at least one processing device being configured:

to obtain multiple items of data related to one or more resources associated with an enterprise;

to process at least a plurality of the multiple items of data into at least one structured query language server;

to correlate at least a portion of the multiple items of data within the at least one structured query language server with at least one target variable using one or more correlation techniques, wherein correlating the at least a portion of the multiple items of data with at least one target variable comprises calculating at least one rank correlation between temporally based differenced values derived from the multiple items of data and the at least one target variable;

to automatically train at least one random forest model and at least one linear regression model based at least in part on the correlated portion of the multiple items of data associated with correlation values above at least one designated threshold, wherein automatically training the at least one random forest model comprises automatically learning model parameters comprising at least one number of samples in at least one node of at least one decision tree, depth of the at least one decision tree, at least one number of random features to associate with the at least one node, and at least one number of trees to be built in one or more random forests;

to generate one or more forecasts pertaining to the at least one target variable and at least a portion of the one or more resources by processing input data related to the at least a portion of the one or more resources using the at least one trained random forest model and the at least one trained linear regression model; and to perform one or more automated actions based at least in part on the one or more forecasts, wherein performing the one or more automated actions com- prises automatically deploying, in accordance with the one or more forecasts, at least a portion of the one or more resources, wherein the at least a portion of the one or more resources comprises one or more hardware devices.

16. The apparatus of claim 15, wherein performing the one or more automated actions comprises automatically allocating, in accordance with the one or more forecasts, at least a portion of the one or more resources in connection with one or more systems.

17. The apparatus of claim 15, wherein correlating the at least a portion of the multiple items of data with at least one target variable comprises calculating at least one Spear- man's rank correlation between the at least a portion of the multiple items of data and the at least one target variable.

18. The apparatus of claim 15, wherein calculating at least one rank correlation between temporally based differenced values derived from the multiple items of data and the at least one target variable comprises calculating at least one Spearman's rank correlation between the temporally based differenced values derived from the multiple items of data and the at least one target variable.

19. The apparatus of claim 15, wherein correlating the at least a portion of the multiple items of data with at least one target variable comprises calculating at least one Spear- man's rank correlation between geographically based data derived from the multiple items of data and the at least one target variable.

20. The apparatus of claim 15, wherein performing the one or more automated actions comprises automatically training at least a portion of the at least one random forest model and the at least one linear regression model using feedback related to at least a portion of the one or more forecasts.

* * * * *